United States Patent [19]
Hauri

[11] Patent Number: 5,549,322
[45] Date of Patent: Aug. 27, 1996

[54] VEHICLE LIFT AXLE

[75] Inventor: Edward D. Hauri, Springville, N.Y.

[73] Assignee: Ashford Concrete, Inc., Springville, N.Y.

[21] Appl. No.: 365,925

[22] Filed: Dec. 29, 1994

[51] Int. Cl.$^6$ ................................................. B60G 11/26
[52] U.S. Cl. ...................... 280/704; 180/209; 280/43.23
[58] Field of Search .................................... 280/704, 702, 280/711, 43.17, 43.23; 180/209

[56] References Cited

U.S. PATENT DOCUMENTS

| | | | |
|---|---|---|---|
| 4,660,842 | 4/1987 | Watt et al. | 280/43.23 |
| 4,705,133 | 11/1987 | Christenson et al. | 180/209 |
| 5,018,593 | 5/1991 | Hermann | 280/704 |
| 5,230,528 | 7/1993 | Van Raden et al. | 280/704 |
| 5,403,031 | 4/1995 | Gottschalk et al. | 280/711 |

FOREIGN PATENT DOCUMENTS

| | | | |
|---|---|---|---|
| 2930155 | 2/1981 | Germany | 280/711 |

*Primary Examiner*—Eric D. Culbreth
*Attorney, Agent, or Firm*—Waldron & Associates

[57] ABSTRACT

The present invention provides an under-frame lift axle assembly for a vehicle, particularly an off-road vehicle, which includes a suspension lower link element having one end mounted to the frame of said vehicle by a first pivotal joint, an axle assembly, adapted to mount a wheel and tire thereon, distal to said first pivotal joint, and a second pivotal joint, permitting articulation of the lower link, medially located on said suspension lower link element, a retractable suspension assembly, such as an air bag suspension assembly, mounted between said frame and the suspension lower link element intermediate to said first pivotable joint and said second pivotal joint, an upper link member to limit or prevent articulation of said suspension lower link element at said medial second pivotal joint when said suspension assembly is deployed to bear a share of the vehicle weight, a lift device, such as a second air bag assembly or the like, to lift said suspension link element and said axle assembly away from ground contact by pivoting said suspension link element relative to said frame about said first pivotal joint and to retract said retractable suspension assembly combined with cylinder, to articulate the suspension link element at the medial second medial pivotal joint when the link element is lifted to move the axle assembly farther from ground contact than provided by the lift device.

6 Claims, 2 Drawing Sheets

VEHICLE LIFT AXLE

BACKGROUND

1. Related Cased

This application represents an improvement on prior patent U.S. Pat. No. 5,018,593, issued May 28, 1991, the disclosure of which is hereby incorporated by reference.

2. Technical Field Of The Invention

The present invention relates to the technical field of heavy vehicles, such as ready mix concrete delivery trucks adapted for both roadway and off-road operation, and to the provision of lift axles for such vehicles to assist in spreading the vehicle weight, particularly when heavily laden, to minimize road damage and bridge damage.

The present invention relates in particular to the field of vehicles for carrying heavy loads, and particularly to improved lift axles for bearing and spreading a share of the lead in high vehicle gross weight conditions in order to comply with highway and bridge load-limitation laws and regulations, which retract to an inactive position when not required.

3. The Prior Art

Lift axles in a variety of configurations are coming into increasing use on heavy load-bearing trucks and related vehicles as means to comply with highway, road and bridge lead limits established by a diverse and complex array of laws and regulations. The dominant requirement for most purposes in the U.S. is the federal vehicle weight limits established by the federal Bridge Gross Weight Formula defined at 23 C.F.R. 658.5 and 658.17.

The federal Bridge Gross Weight Formula provides, in substance, that:

1. Maximum allowable vehicle gross weight is limited to 80,000 pounds.
2. The maximum allowable lead on any single axle is limited to 20,000 pounds.
3. The maximum allowable lead on any tandem axle assembly is limited to 4,000 pounds.
4. The maximum allowable lead on any sequential series of axles must not exceed a weight W, defined by the formula:

$$W = 500 * \left( \left( \frac{L * N}{N - 1} \right) + 12 N + 36 \right) \text{ where:}$$

W is the maximum allowable weight, in pounds;
N is the total number of axles in the sequence;
L is the length of the wheel base between the first and last axles in the sequence.

The formula is made more complex by a series of definitions of single axles, tandem axles, and related provisions that govern the determination of L dimensions and other parameters.

The net effect of the federal Bridge Gross Weight Formula is to allow greater gross vehicle weights, up to the limit, both as overall wheel base is increased, and as the load is spread within that overall wheel base on several axles.

On the other hand, many jurisdictions have overall length restrictions on various types of vehicles. The common limit for a unit truck, i.e., a truck with a unitary non-articulating structure, is 40 feet overall length maximum in most states.

A complex maze of other requirements and limitations apply in various jurisdictions, and the result is a severe set of limitations on the payload of many types of vehicles.

Compliance is increasingly difficult to assure. Noncompliance brings high fines and penalties.

As one type of truck greatly limited by the regulations and laws, ready mix concrete delivery trucks are more often limited in payload by the federal bridge Gross Weight Formula than any other parameter. In most circumstances, a typical three axle ready mix concrete truck will be limited to a legal capacity of about six cubic yards of concrete mix. Equipped with five or even up to six axles and lightweight mixer drum assembly construction, the legal capacity has been extended to 8 to 8¼ cubic yards. More recently, we have been able to offer over ten cubic yards of ready mix concrete pay load in trucks fully compliant with the federal Bridge Gross Weight Formula and with an overall length that does not exceed the common forty foot limitations of many states. Such load spreading is not necessary or desirable in off-road operation, such as at a job site where a load of concrete is to be discharged, for example.

As a general rule, the greater the number of axles, the higher the allowable gross vehicle weight, and thus the net pay load of the vehicle. On the other hand, adding additional axles to a vehicle leads to other disadvantages. Higher rolling resistance, losses in fuel economy, engine wear, steering and handling difficulties under some conditions, losses in traction by the driven wheels in some conditions, and the like all serve to make added axles difficult and expensive.

It is possible to have the advantages of added axles, and to eliminate most of the serious disadvantages by the use of lift axles, designed to be deployed in a down position to bear a portion of the load in highway service, and to be retracted to a level out of contact with the road or ground for off-road operations or for highway operation in unloaded or light load conditions when the weight bearing capacity is not needed.

Lifting the tag axles or other forms of lift axles serves to decrease the load imposed on the front axle of the truck, making steering loads lighter, while increasing the weight and traction on the driving wheels, and shortening the wheel base to aid maneuverability. In addition, tire wear is reduced while rolling resistance and fuel consumption are decreased in off-road operations and in highway operating conditions in light load or unloaded conditions. We also recommend that the lift axle be retracted at any time the vehicle is backed, and prefer to provide for automatic retraction whenever reverse gear is selected by the operator of the vehicle.

There are two major types of lift axles in use. These are under-frame systems, typified by the units available from Suspensions, Inc., and Hi Steer Canada, Ltd., and so-called high lift models, offered by a number of truck builders and suppliers, of which our prior U.S. Pat. No. 5,018,893 is an example.

The under-frame systems are typically pneumatic suspension and retraction mechanisms. Such "air ride" suspensions have been highly developed in recent years and have excellent performance characteristics. As lift axles, these systems are ordinarily based on pivotally mounted leading or trailing links, depending on the location of the assembly. When the link leads the axle, these units are known as "tag" axles. When the link trails the axle, often employed when the assembly is mounted ahead of a tandem axle pair, the unit is normally called a "pusher" axle.

As illustrated in our prior patent, supra, the high-lift systems are in tag axle configuration, and are normally hydraulically actuated. The suspension system may be hydraulic or pneumatic.

The under-frame systems limit ground clearance, and have limited lift clearance, ordinarily no more than about 18 inches. It is often difficult to mount a rear under-frame tag axle in a manner such that the center is more than 96 inches (2.43 m) behind the center of the next forward axle. As a major factor in the L measurements under the federal Bridge Gross Weight Formula, the benefits of a tag axle may be limited in such a case.

The high-lift systems are mounted above the frame, retract to well above the frame, and have excellent ground clearance, but are more prone to failures. Problems generally arise because of the length of the link arms, and because the suspension is provided by the hydraulic system in most units of this type. In prior U.S. Pat. No. 5,018,593, a separate pneumatic suspension system resolves a portion of the problem, but because the suspension is mounted on the link arm and not on the frame of the vehicle, the long lever arm of the links transmits the entire load and is still a considerable problem. The weight of such units is undesirably but necessarily high.

When the vehicle passes across a depression of sufficient span and depth, it is sometimes possible for the entire weight of the vehicle to be placed on the foremost and the rearmost tag axle. With the vehicle in motion, the inertial loading of such a condition can be several times the static load represented by the gross vehicle weight, and failure of the tag axle or the truck frame can result.

Such conditions can occur with substantial frequency for construction vehicles and other combined highway and off-road vehicles. Typical of these is a ready-mix concrete delivery truck, for example, which operates from a ready-mix concrete plant to a job site over the highways, and while at the job site to deliver and discharge its load, is expected to traverse the site whatever its condition may be. There are frequent occasions to cross drainage ditches, swales and other depressions in the topography on the site. If, through operator haste and error, the lift axle is not retracted to its lifted position, front-rear axle bridging may occur. At times, if this occurs at substantial speeds, it results in dynamic inertial loading far in excess of the design requirements for such equipment. Gross vehicle weights of 60,000 to 70,000 pounds (27,272.73 to 31,818.18 kg) are common to such vehicles. Inertial loading in a bridged condition can, in some circumstances, reach as high as 30,000 pounds (13,636.36 kg) or even more, over a beam length spanning, from the front axle to the rear axle, of as much as 30 feet (9.23 m). Under such conditions, failure of the lift axle assembly or the truck frame is inevitable.

In prior application Ser. No. 07/957,030, filed Oct. 10, 1992, we provided an improved lift axle assembly which provides for safer operation and more effective usage of such lift axles, wherein the suspension system of the lift axle assembly is deactivated in overload conditions to prevent damage to the vehicle and to the lift axle assembly in bridging conditions. That invention may be, and preferably will be, employed in combination with the present invention.

In the prior art, and even in our prior invention in Ser. No. 07/957,030, there is an additional problem which is not resolved, that of providing adequate ground clearance when the lift axle of the "under frame" type is retracted to its lifted position.

Particularly when operating off the road, on a construction site or the like, the ground clearance afforded by most under frame lift axles is limited to about 18 inches (45.72 cm); in our prior application, we increased the clearance to about 22 to 24 inches (55.88 to 60.96 cm). While that increase was a welcome and significant improvement, usage indicates that it is still less than desirable and that impacts of the lifted axle and its wheel sets and tire with obstructions on the job site remains a problem.

OBJECTS OF THE INVENTION

It is an object of the present invention to provide an under frame lift axle that has increased ground clearance for the axle and its associated components when retracted to its lifted position.

Another object of the present invention is to afford lift axles which retract the wheel set and tires mounted thereon to a lifted position when the axle is retracted to its lifted position less prone to contact with the ground and obstructions when the vehicle on which the lift axle is mounted is operated off the road.

Particular objects of the present invention are to provide a lift axle designed to:

(1) Provide a lift axle having greater ground clearance than has heretofore been attained with under-frame types but without the higher failure rates and damage associated with high-lift types.

(2) Provide an articulated lower link that permits the axle assembly and its associated components to be retracted to a position with greater ground clearance than can be achieved with a solid lower link beam.

These and still other objects, as will become apparent from the following description and claims, as furnished by the present invention.

SUMMARY DESCRIPTION OF THE INVENTION

The present invention provides an under-frame lift axle assembly for a vehicle, particularly an off-road vehicle, which includes a suspension lower link element having one end mounted to the frame of said vehicle by a first pivotal joint, an axle assembly, adapted to mount a wheel and tire thereon, distal to said first pivotal joint, and a second pivotal joint, permitting articulation of the lower link, medially located on said suspension lower link element, a retractable suspension assembly, such as an air bag suspension assembly, mounted between said frame and the suspension lower link element intermediate to said first pivotable joint and said second pivotal joint, an upper link means to limit or prevent articulation of said suspension lower link element at said medial second pivotal joint when said suspension assembly is deployed to bear a share of the vehicle weight, lift means, such as a second air bag assembly or the like, to lift said suspension link element and said axle assembly away from ground contact by pivoting said suspension link element relative to said frame about said first pivotal joint and to retract said retractable suspension assembly combined with the cylinder, to articulate the suspension link element at the medial second medial pivotal joint when the link element is lifted to move the axle assembly farther from ground contact than provided by the lift means.

BRIEF DESCRIPTION OF THE DRAWINGS

FIG. 1a illustrates the invention with the suspension activated, with the tires in load bearing contact with the ground. FIG. 1b illustrates the lift axle in its intermediate, lifted position. FIG. 1c shows the axle in its final lifted and retracted position, illustrating the increased ground clearance achieved by the present invention.

FIG. 2a shows the system in ground contacting, load bearing position with the suspension elements activated. FIG. 2b shows the same lift axle in its lifted position.

DETAILED DESCRIPTION OF THE INVENTION

Trailing link articulated lift axles are per se known, and represent a convenient starting point for the present invention, with the variations and alterations defined in the present invention. Such lift axle assemblies are available, for example, from Suspensions, Inc., located in Canal Fulton, Ohio.

In such lift axle assemblies, the articulation of the lower link is an active part of the suspension geometry, serving to dynamically change the king pin axis angle relative to the road surface to improve tracking of the wheels during active suspension operation in response to variations in the road surface. The upper link of the suspension is a fixed length in the Suspensions, Inc., system.

Figure 2A:
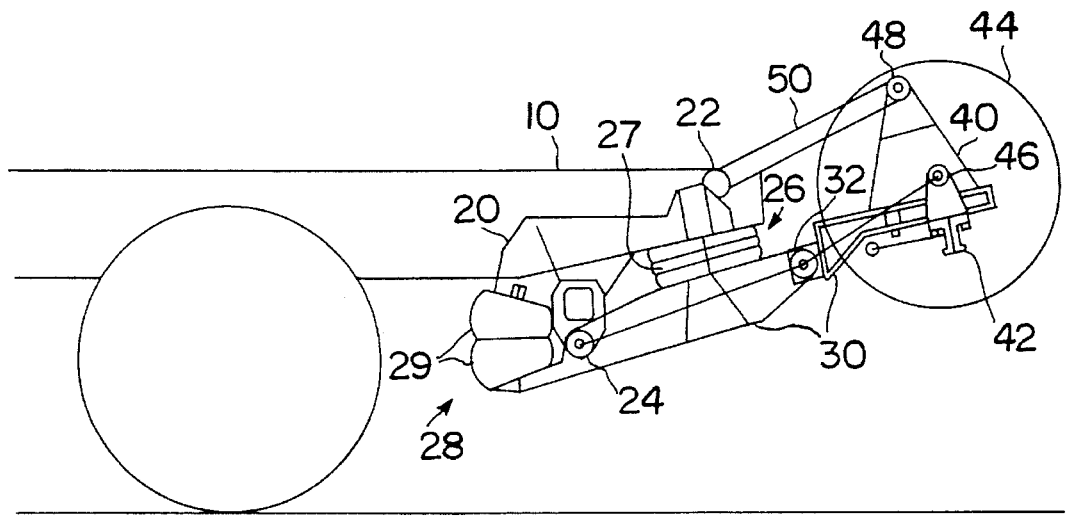
FIGS. 2a and 2b are schematic elevations of the lift axle of the prior art in its two aspects of operation and usage.
Figure 2B:
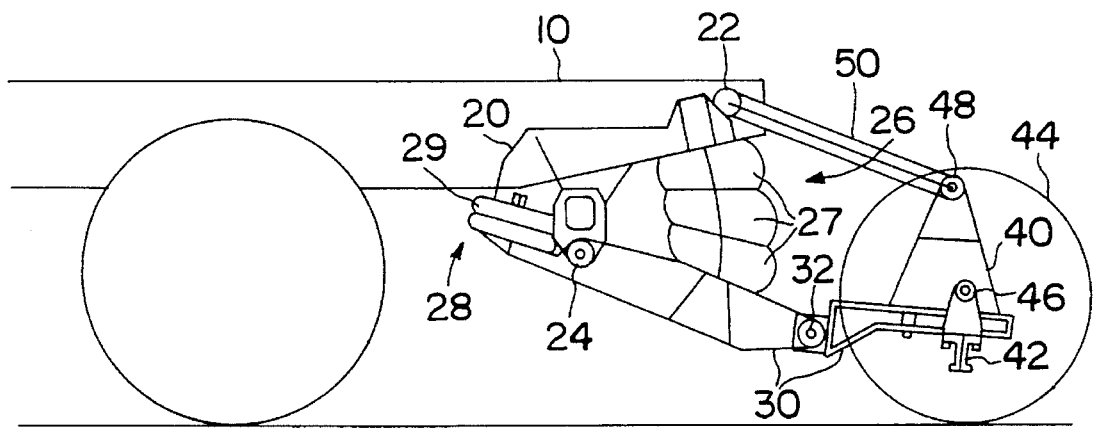

The suspension geometry is shown for the Suspensions, Inc., system where FIG. 2a illustrates the active mode, while FIG. 2b shows the position of the elements when the suspension is lifted and inactive.

In operation, as those of ordinary skill in the art will readily recognize, the Suspensions, Inc., system operates as a trailing (or leading) quadrilateral link, sometimes referred to as a parallelogram link despite the fact that the linkage is almost never a true parallelogram in modern usage. The upper link of the quadrilateral, beam (50), is shorter than the lower link. In addition, the lower link (30) is provided with a pivot (32). Articulation about the lower link medial pivot (32) occurs when deflection is caused by the wheel passing over a bump, in addition to deflection about frame mounted pivot (24), as the air bag (27) is compressed.

The wheel set is mounted on the axle assembly (40), at the terminal end of lower link (30), and includes a king pin, a stub axle set into the live axle beam (42) with wheel bearings, on which is mounted a wheel and tire. The wheel set is also normally equipped with a brake. The kingpin is provided with castor and camber to promote tracking of the wheel, in known fashion.

As the suspension deflects in response to variations in the road surface, the angle of the kingpin axis, relative to the ground, changes as a result of the unequal lengths of the upper and lower links. The pivotal articulation at medial pivot (32) on the lower link serves to control the castor and camber change with deflection of the suspension to optimize the kingpin angle and the changes in castor and camber to appropriate values in response to the amount of deflection. When the suspension is raised, the components of the quadrilateral link have the configuration shown in FIG. 2b.

In the present invention, the upper link is modified to be controllably variable in length.

When the axle is lowered and activated to bear a portion of the vehicle weight, the upper length is fixed or biased to have a substantially fixed length, to operate substantially as it does in the Suspensions, Inc., system.

When the suspension is deactivated and the lower link is raised to a position corresponding to FIG. 2b, the upper link is functionally shortened to pivot the axle assembly toward the mounting position and, necessarily, upward to a further retracted position, increasing the clearance between the axle assembly, together with its associated components, and the ground.

Variable length upper links have been employed in lift axles in the prior art. See Lange, U.S. Pat. No. 4,770,430. In that system, the variable length upper arm does not play any role in the retraction or in attaining greater ground clearance, but rather serves to alter the king pin axle axis orientation to improve tracking of the wheel set when the vehicle is operated in reverse. The Lange system is functional and operative only when the suspension is lowered and in an active load bearing mode.

In our system, we normally provide, and greatly prefer, to manually or automatically retract the suspension whenever the vehicle is operated in reverse, and our system is not operative to employ the Lange system. Although it could, of course be modified and adapted to employ the Lange invention, we do not recommend or approve such operation, modifications or adaptations, as backing of a vehicle with a deployed lift axle is inherently less safe and we prefer that it be avoided.

Figure 1A:
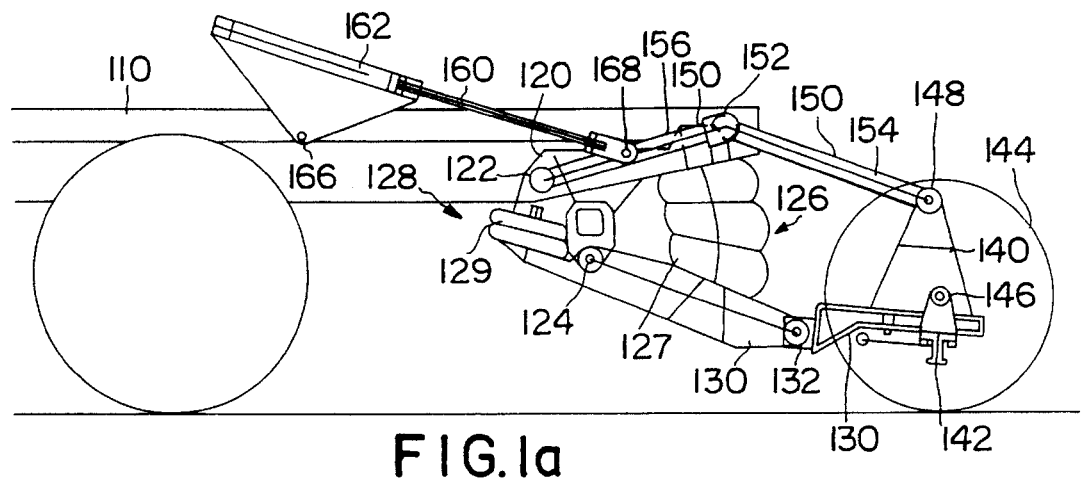
FIGS. 1a, 1b and 1c are schematic elevations of the lift axle of the present invention in three different stages of its operation and usage.
Figure 1B:
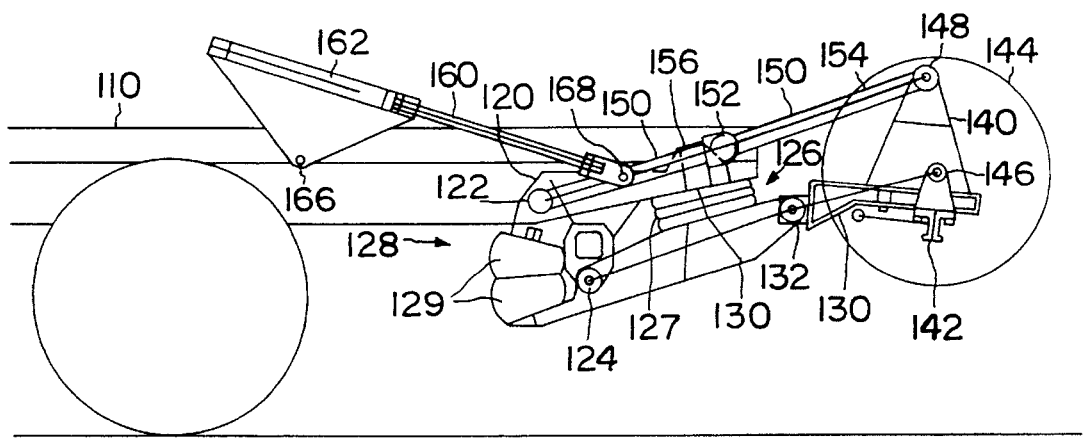

In the active, load bearing mode, the upper link is, in our invention, substantially fixed in length, so that it functions in substantially identical fashion to the upper link of the preferred Suspensions, Inc., system from which our invention is derived. Such operation is illustrated in FIG. 1a and FIG. 1b.

Figure 1C:
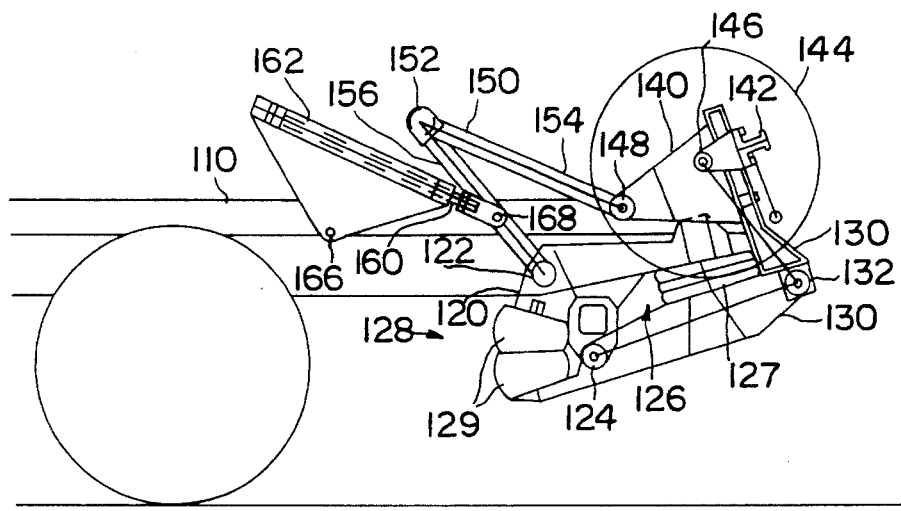

The variable length of the upper link is employed in the retraction of the suspension to its fully lifted position, as illustrated in FIG. 1c, from the intermediate position shown in FIG. b. The system in operation may both activate the first lifting mechanism and the upper link length control mechanism is sequence or simultaneously, as preferred. If operated simultaneously, the position shown in FIG. 1b may never be literally attained, as those of ordinary skill in the art will recognize, but the intermediate position is helpful even in such circumstances to understand the articulations involved and their respective roles. If the two lifting mechanisms are operated sequentially, the axle lower link assembly will first be lifted to the position shown in FIG. 1b, and then be articulated to the farther lifted position shown in FIG. 1c.

As those of ordinary skill in the art will readily recognize, it is possible to limit the retraction, or either of its component motions, if necessary to avoid interference with the components of the vehicle or the apparatus attached to and borne on the frame in the area of the lift axle assembly. In our illustrations of the invention, we show the full range of action attainable, which is preferred.

The position of the lift axle assembly and the dimensions of the components of the assembly of the present invention on the frame of the truck will ordinarily be dictated by the requirements of the federal Bridge Gross Weight Formula, or comparable restrictions. The assembly may be employed at the aft-most end of the frame or forward of the rear axle bogie, or both. The assembly may be fitted in tag or pusher configuration. Our illustrations are directed to a rear mounted tag axle, which is the most commonly employed as the gains in pay-load are greatest for such a configuration. All such mountings are substantially equivalent in structure and operation, with the only significant variations being orientation of the king pin axis to be uniform in both tag and pusher versions, which does not form a part of the present invention, and the assurance of clearance of the frame of the vehicle and ancillary equipment mounted in the vicinity of the axle mounting.

The specific mechanisms for varying the effective functional length of the upper link are not limited, and a wide variety of techniques can be employed, with the understanding that the strength of the specific mechanism must be adequate to sustain the loads imposed in operations, and the actuations described herein must be effectively accomplished.

For simplicity, reliability and limiting the cost, we prefer the folding arm, pivoted in an approximately central position of the upper link, as shown in FIG. 1a, 1b and 1c, actuated by a hydraulic cylinder, pneumatic cylinder, a jack screw actuator, or the like.

The preferred suspension, as shown is a pneumatic air bag assembly, as is the lift mechanism. These components may also be hydraulic; hydraulic suspensions and lift assemblies and associated components are known, and their employment and control are familiar to those of ordinary skill in the art. It is possible to combine the active suspension action and the lifting action in a single, double acting hydraulic mechanism. Coil or leaf springs may also be employed, although the complexity, expense and weight of providing for actuation and retraction make these approaches less favored.

In operation, it is generally preferred that the lift and deployment of the lift axle remain unaltered from that known in the prior art, with the retraction, via the variable length upper link arm being employed independently. By keeping these operations separate and sequential in operation, the possibility of conflicting operation is eliminated. Of course, should the retraction be disabled in any way, the lift action can be employed, although without the same clearance attained through the retraction.

A lifting tag axle with an articulating lower link arm and pneumatic suspension was obtained from Suspensions, Inc., of Canton, Ohio, in the configuration illustrated in FIG. 2.

The basic suspension, without the use of the present invention, as illustrated in FIGS. 2a and 2b, where FIGS. 2a and 2b represent the suspension in its deployed configuration, with the tires mounted on the lift axle in contact with the ground. FIG. 2b represents the same structure, with the axle and the wheel and tire components in the lifted position.

With reference to FIG. 2a, the assembly is mounted on the trailing end of the frame of a truck (10), by mounting sub frame assembly (20), having upper and lower pivot mounts (22) and (24), respectively. Also mounted on the sub frame assembly (20) are a pneumatic suspension assembly (26), and a pneumatic suspension lifting assembly (28). A lower link (30) is pivotally mounted on the sub frame assembly (20) at the lower pivot mount (24), and engaged with the pneumatic suspension assembly (26), and a pneumatic suspension lifting assembly (28). In FIG. 2a, the pneumatic suspension assembly (26) is pressurized and active, with suspension airbag (27) inflated, so that the lift axle assembly of FIG. 2a is in load bearing configuration. At the same time, the pneumatic suspension lifting assembly (28) is depressurized, with lifting airbag (29) collapsed and inactive. As those of ordinary skill in the art will recognize, the pneumatic suspension is particularly desirable, but the invention may be employed with mechanical or hydraulic suspensions as well.

The lower link (30) is articulatable via the medial pivoting joint (32). At the end of the lower link (30) distal to the sub frame assembly (20), is mounted an axle assembly (40), of usual configuration and adapted for operational mounting of an axle set (42), a wheel set and tires (44), also usual in their construction and mounting. The axle assembly (40) is itself pivotally mounted to the lower link arm (30) at a lower pivot (46). The axle assembly (40) also has an upper pivot (48), disposed above the lower pivot (46). A fixed length upper link arm (50) is pivotally mounted on the two upper pivots, the axle assembly upper pivot (48) and the sub frame assembly upper pivot (22).

In FIG. 2b, the same elements are shown with the suspension deactivated and the lift axle assembly in lifted position. In FIG. 2b, each element is represented by the same reference numbers. In FIG. 2b, the pneumatic suspension assembly (26') is depressurized and inactive, and the suspension airbag (27') is collapsed, while the pneumatic suspension lifting assembly (28') is pressurized and the lifting airbag (29') is inflated, lifting the lower link (30') and the elements carried on the distal end away from the ground. In usual and conventional employment of the lift axle of FIGS. 2a and 2b, the clearance between the tire (44) and the ground would generally be in the range of about 18 to about 24 inches (about 45 to about 60 cm).

As those of ordinary skill in the art will recognize, the pivots (22), (24), (46) and (48) define the vertices of a quadrilateral link suspension. In the deployed configuration of FIG. 2a, the pneumatic suspension assembly (26) extends between the truck frame (10), via sub frame assembly (20) to the lower link (30) to bear an increment of the vehicle weight. When the vehicle encounters a bump while in motion, the upward pressure on the tire (44) is transmitted by the lower link (30) to the pneumatic suspension airbag (27), which is compressed to absorb the transient loading and permits the suspension to deflect upwardly by a limited lifting of the lower link (30) relative to the truck frame (10). When the bump is passed, the suspension airbag (27) rebounds, and presses the lower link (30) downwardly to maintain weight bearing ground contact at the tire (44).

If the suspension were a true parallelogram linkage, the operational deflection of the lift axle in response to bumps would maintain a uniform king pin angle relative to the frame of the vehicle. Experience has shown, however, that a tag axle with a true parallelogram linkage tracks poorly, resulting in steering problems and excessive wear on the tag assembly and particularly on tires mounted on the tag axle.

In the tag axle assembly shown in the FIGS. 2a and 2b, the linkage is not a parallelogram, and the upper link (50) is shorter than the lower link (30). In addition, the lower link (30) is provided with medial pivot (32). These elements coact to permit a slight articulation of the lower link (30) about the pivot (32) in response to upward pressure on the tires (44) as bumps are encountered. A further attribute of the coaction of the length of the upper link (50) and the articulation of the lower link (30) at pivot (32) is to alter the king pin angle of the axle assembly (40) as the suspension deflects, so that the king pin angle is optimized for improved steering and tracking. In particular, as the lower link (30) articulates at the lower link medial pivot (32), the axis of the king pin relative to the vertical is canted rearwardly, relative to the upper end of the king pin, which coacts with the castor and/or camber built into the king pin assembly to produce the intended result in known fashion.

It is the quadrilateral link that permits the lifting action as defined and discussed above, as illustrated in FIG. 2b. While such lifting action does create an articulation of the lower link (30') about the lower link pivot (32') in relation to the positions shown in FIG. 2a, the articulation does not contribute to the ground clearance of the assembly and is, in fact, counterproductive to a very modest degree, on the order of about 1 to about 2 inches (about 2.54 to about 5.08 cm).

With the lift axle assembly of FIGS. 2a and 2b as a starting point, the following modifications according to the present invention were made:

The upper link 150, as shown in FIG. 1a, was increased in length, with a corresponding pivot (122) mounted on the sub frame assembly (120) at a more forward position than the sub frame assembly upper link (22) employed in FIGS. 2a and 2b. The upper link is provided with a pivot (152) in a generally medial position, so that the rearward element (154) of the link (150) is at least comparable in length, and preferably is substantially about the same length as the upper link (50) of the assembly of FIG. 2. It is preferred that the positioning element(s) which control the location of the upper link (150) elements, discussed below, are so arranged that when deployed in the load bearing configuration of FIG. 1a, the upper link medial pivot (152) is held in substantially the same location, relative to the axle assembly and the sub frame assembly (120), as in the original design shown in FIGS. 2a, 1b and 1c. While the positioning need not be an exact correspondence with the corresponding position of FIG. 2, and indeed, need not even be a rigidly fixed position, it is desirable to maintain a limited variance from the geometry and operation of the original design in the active suspension operating mode of FIG. 1a. The control of the king pin angle, as discussed above, is unaltered in the deployed position of FIG. 1a from that of the unmodified design of FIG. 2a. The tracking and steering properties of the system are independent of the present invention.

The actuation of the lifting action in the present invention is unchanged from the initial design of the prior art. The suspension air bag (127) is depressurized, while the lift mechanism air bag (129) is inflated, causing the lower link (130) to be lifted away from ground contacting position, carrying the axle assembly (140) and its wheel and tire (144) upwardly with it to a position shown in FIG. 1b, corresponding the that of the original structure in FIG. 2b.

Once the assembly is in the lifted position shown in FIG. 1b, the retraction can be actuated to retract the axle assembly (140) in an upward and forward arcuate path (in the case of a tag axle mounting as shown) about the lower link medial pivot (132) to a point where the axle and its wheel set and tires are positioned well above the ground, as shown in FIG. 1c. As seen in FIG. 1b and 1c, the retraction is effected by changing the effective length of the upper link (150), to shorten the distance between upper pivots (122) and (148). As the pivot (122) is fixed to the frame of the truck, the resultant motion of shortening the effective length of upper link (150) is to cause the upward retraction to the position shown in FIG. 1c. In typical installations, the increase in ground clearance will be on the order of fifty percent or more of that provided by the lifting action only. Clearance of the ground by the tire may be as much as forty inches (101.6 cm) or more, depending on the specific details of the mounting and the diameter of the tire.

As shown in FIGS. 1a, 1b and 1c, the retraction of the axle and wheel set is actuated by an actuator (160), which is typically a hydraulic or pneumatic cylinder (162), or a driven jack screw with an electrical drive mechanism, or the like, mounted on the truck frame (110) and attached to upper link (150) at a suitable position on forward segment (156). The mount to the vehicle frame and the attachment to the link arm are pivotal mounts (166 and 168), allowing the actuator to adapt its position to the motion of the upper link forward segment (156) relative to vehicle frame (110), and the position of pivotal mount (168). As retraction proceeds, the distance of the span between pivot (122) and pivot (148) is progressively reduced.

As FIGS. 1a, 1b and 1c illustrate the tag mounted lift axle assembly of the present invention moves forward during retraction as well as upward. The resulting reduction of aft overhang is a considerable advantage and safety feature in service.

The specific geometry of the articulation actuator is not a critical parameter of the invention, as the elements can be positioned and adapted in a variety of ways to achieve the objectives described herein. The form of actuator illustrated in FIGS. 1a, 1b and 1c, and the articulation actuator geometries illustrated in FIGS. 1a, 1b and 1c are but one fashion in which these elements can be arranged to effect the retraction from the lifted position and the locating function of the upper link arm when the suspension is deployed in active load bearing condition. The specific location of the actuator elements and their operation will most frequently be dictated by the other components of the vehicle, the attainment of the clearances and loading points required, and convenience of construction, installation and maintenance more than any specific functional requirements.

As in any such system, the components must be engineered to bear the loads to be encountered with adequate safety margins. Such engineering development of the lift axle assembly and its components is well within the ordinary level of skill in the art.

As previously noted, we prefer to combine the present invention with that of prior co-pending application Ser. No. 07/957,030 to provide that the suspension be deactivated when an overload condition occurs, and that the suspension be retracted when the transmission is placed in reverse, in addition to retraction actuated by the operator of the vehicle during off-road, job site operation.

Deactivation in response to overload is a fundamental safety requirement to prevent the vehicle from damage and from causing other damage or injury. Such deactivation ordinarily may be followed by a reactivation of the suspension without operator intervention, or may require the operator to take specific action to reactivate the suspension, i.e., the suspension air bag in the preferred embodiment of the invention. Lifting and retraction are ordinarily not a required part of the overload release function, and will generally not be employed.

In reverse, full lifting and retraction are desirable and preferred in the practice of the present invention. When the vehicle is backed, the visibility of the driver is limited, and collision of the tag axle assembly with on site obstructions can do substantial damage. In addition, the axle assembly of the present invention is not aligned and oriented to track well when the vehicle is backed, and steering difficulties and wear on the mechanisms and components are undesirable features of backing with the lift axle deployed. The undesirable aspects of backing the tag axle are best and most completely avoided by lifting and retracting when the transmission is placed into reverse gear. The added complexity of the system disclosed by Lange, supra. are not desirable and are not recommended for use with the present invention. With the use of the reverse gear lifting and retracting of the assembly, as system such as that of Lange is not useful.

The foregoing description of the invention is intended for the illustration and guidance of those of ordinary skill in the art and are not intended as limiting on the scope of the invention. The metes and bounds of the invention are set out in the following claims.

What is claimed is:

1. A lift axle for a vehicle comprising:
  A. a suspension lower link element having one end thereof mounted to the frame of said vehicle by a first pivotal joint, an axle assembly, adapted to rotably mount a wheel and tire thereon, distal to said first pivotal joint, and a second pivotal joint medially located on said suspension lower element;
  B. a retractable suspension assembly mounted between said frame and said suspension link element intermediate to said first pivotable joint and said second pivotal joint;

C. an upper link means to limit and articulation of said suspension link element at said medial second pivotal joint when said suspension assembly is deployed, said upper link means having a variable effective length when said suspension lower link element is lifted away from ground contact;

D. a lift means to lift said suspension lower link element and said axle assembly away from ground contact by pivoting said suspension lower link element relative to said frame about said first pivotal joint and to retract said retractable suspension assembly; and E. a retraction means to articulate said suspension link element at said medial second pivotal joint when said link element is lifted, reducing the variable effective length of said upper link to move said axle assembly farther from ground contact than provided by said lift means.

2. The lift axle of claim 1 wherein said suspension is a pneumatic bag suspension.

3. The lift axle of claim 1 wherein said retraction means a member selected from the group consisting of a pneumatic double acting cylinder, a hydraulic double acting cylinder and a jack screw assembly.

4. The lift axle of claim 1 wherein said upper and lower links are elements of a quadrilateral suspension geometry.

5. The lift axle of claim 1 wherein said lift axle is a tag axle.

6. The lift axle of claim 1 wherein said lift axle is a pusher axle.

* * * * *